United States Patent [19]

McSparran et al.

[11] 4,339,704

[45] Jul. 13, 1982

[54] SERIES PARALLEL TRANSITION FOR POWER SUPPLY

[75] Inventors: Lloyd W. McSparran, Erie; Russell M. Smith, North East, both of Pa.

[73] Assignee: General Electric Company, Erie, Pa.

[21] Appl. No.: 166,680

[22] Filed: Jul. 7, 1980

[51] Int. Cl.³ .................... H02M 7/00; H02P 9/00
[52] U.S. Cl. .................................... 322/90; 307/71; 318/140; 363/67; 363/69
[58] Field of Search ............... 318/111, 140, 112; 322/29, 32, 7, 90; 363/67–69; 307/16, 71

[56] References Cited

U.S. PATENT DOCUMENTS

| | | |
|---|---|---|
| Re. 23,314 | 12/1950 | Nims . |
| 3,419,786 | 12/1968 | Brane . |
| 3,694,731 | 9/1972 | Cherry ........................ 363/69 X |
| 3,932,765 | 1/1976 | Townsend ................... 322/29 X |
| 3,984,750 | 10/1976 | Pfeffer et al. ............... 322/90 X |
| 4,009,431 | 2/1977 | Johnson ...................... 307/71 X |

FOREIGN PATENT DOCUMENTS 2254937  5/1977  Fed. Rep. of Germany .

Primary Examiner—Robert J. Hickey
Attorney, Agent, or Firm—Albert S. Richardson, Jr.

[57] ABSTRACT

A multi-winding a-c electric power supply is connected to a d-c load circuit via a power rectifier assembly comprising at least two legs connected in parallel across the load circuit. Each leg has at least four serially interconnected unilaterally conducting devices. A first one of the power supply windings is connected between the two rectifier legs at points between first and second devices thereof, and a duplicate winding (voltages of both windings are in-phase and of equal amplitude) is connected between the legs at points between third and fourth devices thereof, whereby the windings are effectively connected in parallel. The respective junctures of the second and third devices in all of the rectifier legs are interconnected by switching means which, upon switching to a closed circuit state, short circuits these junctures and thereby changes the connection of the windings from parallel to series.

6 Claims, 6 Drawing Figures

SERIES PARALLEL TRANSITION FOR POWER SUPPLY

CROSS REFERENCE TO RELATED APPLICATION

Certain features of the illustrated embodiments of this invention are the claimed subject matter of copending patent application Ser. No. 166,622 filed concurrently herewith for P.A. Bond and assigned to the General Electric Company.

BACKGROUND OF THE INVENTION

This invention relates generally to a multi-winding electric power supply system wherein separate windings of the supply can be alternatively connected in either series or parallel circuit relationship, and it relates more particularly to power supplies of this kind that are useful in electrical propulsion systems for traction vehicles.

Propulsion systems for traction vehicles such as locomotives commonly use a diesel engine prime mover to drive electric generating means for supplying energy to a plurality of pairs of direct current (d-c) traction motors. The generating means typically comprises a 3-phase traction alternator whose alternating voltage output is rectified and applied to relatively positive and negative d-c buses between which the respective pairs of motors are connected in parallel. The output power of the alternator is regulated or varied by suitably controlling the strength of its field excitation and the rotational speed of the engine. For maximum efficiency the controls of the propulsion system are suitably designed to work the engine on its full horsepower curve throughout a wide speed range of the locomotive.

In order to accelerate a locomotive from rest, the alternator must supply maximum current to the traction motor so that they can provide high tractive force or effort, but at low speed the output voltage of the alternator can be relatively low because the counter emf of each motor is a function of locomotive speed. When relatively high speed operation of the locomotive is desired, the alternator must apply maximum voltage to the traction motors to overcome their high counter emf, but the alternator output current can now be relatively low because the motors draw less current at high speed than at low speed. To accommodate both of these extremes without reducing the useful horsepower of the engine and without requiring an unreasonably large or expensive alternator, it has heretofore been common practice to provide speed responsive means for transitioning between parallel and series the circuits that interconnect the two motors forming each pair of traction motors in the propulsion system. At low speeds, when high current but low voltage is required, the motors in each pair are interconnected in series with one another, whereas at high speeds, when high voltage but low current is required, all of the motors are configured in a parallel mode. The change of modes is accomplished by means of suitable contactors in the motor circuits, which contactors are actuated automatically in response to the sensed speed of the locomotive traversing a predetermined critical speed between high and low speed ranges.

When an accelerating locomotive attains the aforesaid critical speed that initiates a transition of each pair of traction motors from series mode to parallel mode, all of the motors are temporarily disconnected from the d-c bus (to avoid undesirable short circuits) before they are reconnected in parallel. However, before this switching sequence begins the alternator field excitation level is reduced so that the output voltage of the alternator will be very low or zero when the series contactors are opened. If the output voltage were not lowered in this manner, it would be near its maximum value at the transition speed of the locomotive with each pair of motors still connected in series, and the series contactors might flash over when opened. Once the voltage has been lowered and the series contactors have been safely opened, and after the parallel contactors are subsequently closed, excitation is restored to the proper level for increasing the alternator output voltage to a new value which is approximately one-half of its value just before the locomotive attains the transition speed. The time required to complete this prior art series-to-parallel motor transition sequence, including the time to restore power to its desired level, has typically been appreciably longer than ten seconds. This method is accompanied by undesired loss in acceleration and tractive effort.

In the prior art arrangement summarized above, when the paired motors are connected in the series mode, a problem can arise if one of the locomotive axle-wheel sets loses adhesion and begins to slip on the rails. The particular traction motor that is coupled to the slipping wheel set will accelerate faster than the other motors, and this condition, if uncorrected, could result in rail grinding, wheel spalling, and motor overspeed. During the wheel slip condition the affected motor experiences increasing counter emf and decreasing current. The second motor with which the affected motor is serially paired will accordingly suffer the same decrease in current, and its voltage will decrease by an amount equal to the increase in voltage of the slipping motor. As a result neither motor can use the energy intended for it, and since the system regulates constant horsepower, power will shift to the non-slipping wheel sets, increasing their tendency to slip.

If all of the motors could be connected in parallel during low speed, high tractive effort operation of the locomotive, the effect of a slipping wheel set on the others would be less severe. That is, if a wheel slip occurs, the acceleration above rail speed can no longer be as drastic as in the series configuration because the voltage of the affected motor is clamped to the bus of the other motors. Also the shift in power out of the slipping motor will be absorbed by more motors than before, reducing the tendency to precipitate slips of other wheel sets. The parallel configuration, then, has inherent advantages in the control of wheel slips, and the net useable adhesion can be materially improved.

In order to keep the traction motors permanently in parallel, it has been previously proposed to utilize a dual winding alternator having two sets of 3-phase armature windings that can be connected either in parallel (for low speed, high current operation) or in series (for high speed, high voltage operation). See German Pat. No. 2,254,937, U.S. reissue patent Re. No. 23,314, and U.S. Pat Nos. 3,984,750 and 4,009,431. All of these known prior art approaches have involved providing individual rectifying bridges or units for each set of alternator windings and selectively switching the d-c outputs of the respective rectifier units between series and parallel connections in response to the transition-initiating event.

SUMMARY OF THE INVENTION

A general objective of the present invention is to provide an improved power supply system in which a multi-winding source of alternating current is coupled to a direct current load circuit through a novel power rectifier assembly including means for simply yet effectively switching the connections of the source windings between parallel and series.

Another object of the invention is to apply such a rectifier assembly to a traction vehicle propulsion system wherein the multi-winding source comprises an alternator having two sets of 3-phase windings.

In carrying out the invention in one form, a multi-winding source of alternating current is connected to a pair of d-c load buses by way of a special rectifier assembly comprising at least first and second legs connected in parallel between the d-c buses. Each leg comprises first, second, third, and fourth unilaterally conducting devices connected in series with one another and polled to conduct current in a direction from one of the buses to the other. The source includes at least first and second windings so arranged that the alternating voltage generated in the first winding will be substantially in phase with the alternating voltage generated in the second winding. Means is provided for connecting the first winding between a point between the first and second devices of the first rectifier leg and a point between the first and second devices of the second rectifier leg and for connecting the second winding between a point between the third and fourth devices of the first rectifier leg and a point between the third and fourth devices of the second leg. The respective junctures of the second and third devices in both legs of the rectifier assembly are interconnected by switching means having an open circuit state and a closed circuit state. The switching means is selectively switchable between these states in response to transition command signals. When the switching means is in an open circuit state, the first and second windings of the source are effectively connected in parallel between the d-c load buses, and when it is in a closed circuit state the aforesaid junctures are short circuited and the first and second windings are effectively connected in series between the buses.

As applied to a traction vehicle propulsion system, the aforesaid multi-winding source comprises a traction alternator having first and second separate sets of 3-phase windings so arranged that the alternating voltages generated in the respective windings of the first set will be substantially in phase with the alternating voltages generated in the corresponding windings of the second set, and the rectifier assembly comprises three parallel legs. The three windings of the first set of alternator windings are connected to the respective rectifier legs at the points between the first and second devices thereof, and the three windings of the second set are correspondingly connected to the respective rectifier legs at the points between the third and fourth devices thereof. The respective junctures of the second and third devices in the first and second legs of the rectifier assembly are interconnected by first switching means, and the respective junctures of the second and third devices in the second and third legs are interconnected by second switching means. Consequently, when both of the first and second switching means are in their open circuit states the two sets of alternator windings are effectively connected in parallel between the d-c load buses, whereas when both switching means are in their closed circuit states the winding sets are effectively connected in series between the buses. Suitable means is provided for actuating the first and second switching means between their open and closed circuit states. Preferably the actuating means is constructed and arranged in accordance with the teachings of the cross-referenced copending patent application Ser. No. 166,622.

The invention will be better understood and its various objects and advantages will be more fully appreciated from the following description taken in conjunction with the accompanying drawings.

DESCRIPTION OF THE PREFERRED EMBODIMENTS

Figure 1:
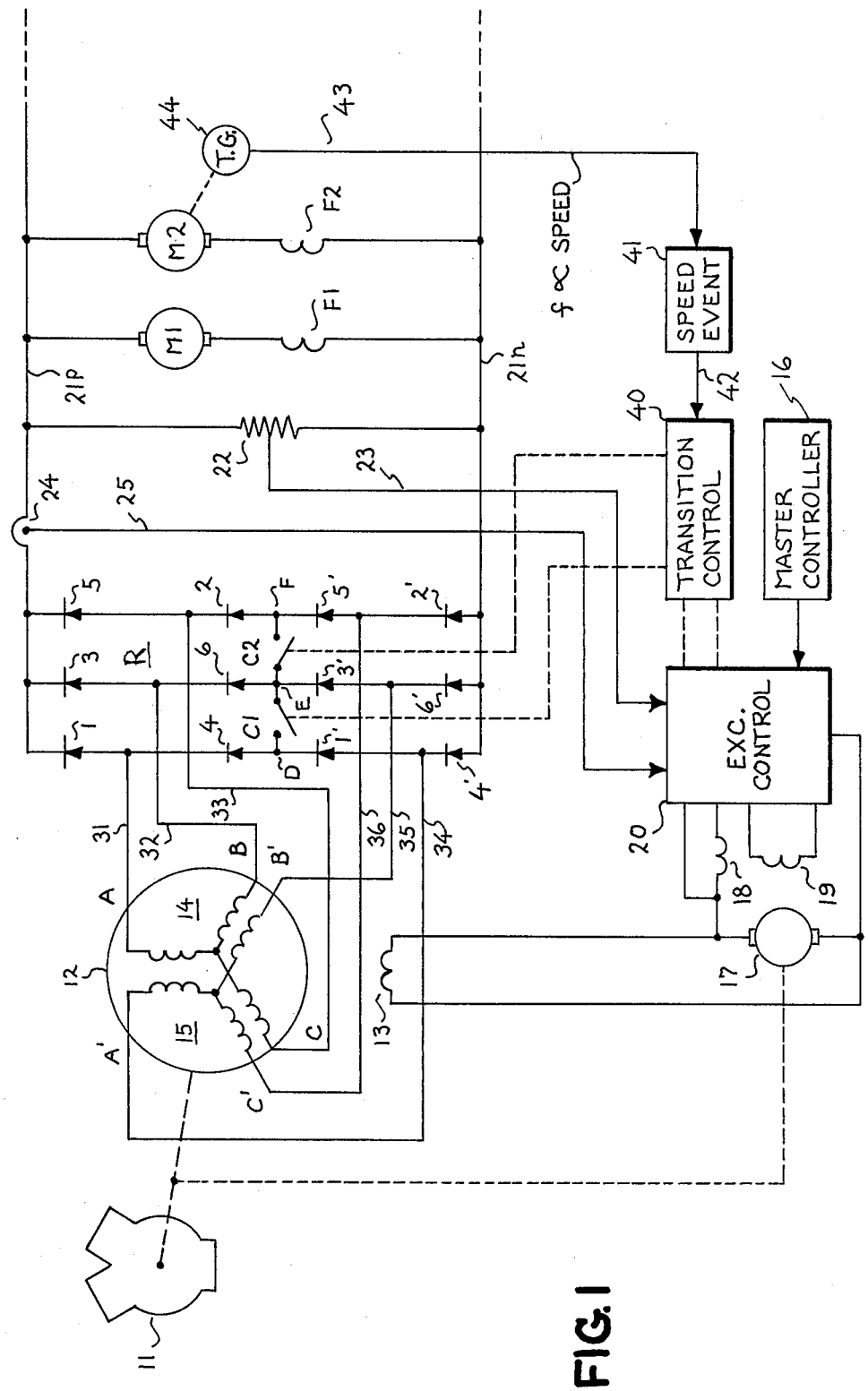
FIG. 1 is a functional block diagram of an electric propulsion system for a traction vehicle, which system includes a dual winding alternator and means for transitioning the alternator windings between series and parallel modes.

Referring now to FIG. 1, there is shown in schematic diagram of the invention as applied to a propulsion system for a self-propelled traction vehicle such as a diesel-electric locomotive. In the illustrated system a prime mover 11 comprising a diesel engine is mechanically coupled to the rotor of a dynamo-electric machine 1 comprising a dual winding traction alternator. The engine 11 is supercharged by a turbocharger (not shown). The alternator 12 has a field winding 13 and first and second separate sets of armature windings, each set comprising three windings interconnected in a 3-phase star configuration. The field winding is physically located on the rotor of the alternator 12, and the two sets of armature windings are physically located on the stator. In FIG. 1 the three different phases of the first set 14 of armature windings are respectively identified by the letters A, B, and C, and the three different phases of the second set 15 of duplicate windings are respectively identified by the letters A', B', and C'.

In a conventional manner, the engine 11 drives the alternator field 13 at a rotational speed determined by the position of an operator controlled 8-notch throttle in a Master Controller block 16. The throttle is suitably coupled to a main governor that controls the fuel supplied to the engine so as to maintain the actual engine speed substantially equal to the called for speed. (While neither the throttle nor the governor is shown in FIG. 1, both are conventional components of a diesel-electric locomotive). Assuming there is direct current in the field winding 13, the resulting rotating magnetic field induces alternating voltages in the armature windings of the alternator 12. The armature windings are so arranged that the alternating voltage generated in the respective phases A, B, and C of the first set of windings 14 will be substantially in phase with the alternating voltages generated in the corresponding phases A', B', and C' of the second set 15. The fundamental amplitude of these voltages depends on both the speed of the engine 11 and the magnitude of field current. The latter current is supplied by suitable excitation means which is illustrated as a rotating exciter 17 also driven by the engine 11.

The exciter 17 has a series field winding 18 and a separately excited shunt field winding 19 which is energized by excitation control means 20. The latter means preferably comprises a constant horsepower excitation control arrangement such as is described and claimed in U.S. Pat. No. 3,878,400—McSparran assigned to the General Electric Company. Persons skilled in the art will understand that the referenced excitation control means 20 is effective to variably excite the alternator field winding 13 so as to control the electrical output of the alternator 12, with the normal level of field excitation being varied as necessary to prevent the actual values of selected electrical output parameters of the alternator (e.g., voltage, current, and their product) from respectively exceeding desired limits thereof. These limits are a function of the throttle setting. In this manner the power output of the alternator 12 can be matched to the available horsepower of the engine 11.

The dual sets of armature windings of the alternator 12 are connected via power rectifying means R to a pair of direct current (d-c) power buses 21p and 21n which in turn are adapted to be connected to a d-c load circuit. In the FIG. 1 embodiment of the invention, the load circuit comprises a plurality of d-c traction motors M1 and M2 permanently connected in parallel with one another between the d-c buses. These motors include series fields F1 and F2 which are connected through reversing contactors (not shown) to their respective armatures. The motor rotors are mechanically coupled by speed-reduction gearing to separate axle-wheel sets (not shown) of the locomotive for propelling or electrically retarding the vehicle. It should be understood that in normal practice a locomotive will have at least two and sometimes four more traction motors connected in parallel with M1 and M2.

The average magnitude of voltage across the d-c buses 21p and 21n determines motor speed. This voltage is detected by a conventional voltage transducer 22, and a representative signal is fed back on a line 23 to the excitation control means 20. The magnitude of load current out of the rectifying means R is a measure of motor torque and hence of tractive effort (assuming that the wheels of the locomotive maintain adhesion). A conventional current transducer 24 is provided to detect the total load current in the relatively positive bus 21p, and a signal representative of current magnitude is fed back to the control means 20 on a line 25.

The rectifying means R is formed by an array of uncontrolled electric valves or solid-state power rectifier diodes, herein also referred to as unilaterally conducting devices, which are interconnected and arranged between the alternator 2 and the d-c buses 21p and 21n in a special configuration that will now be described, whereby the alternating current (a-c) output of the alternator 12 is converted to a unidirectional current suitable for energizing the paralleled d-c traction motors. In the FIG. 1 embodiment of the invention, the rectifying means R has three legs connected in parallel circuit relationship between the d-c buses. A first one of the three legs comprises a first diode 1, a second diode 4, a third diode 1', and a fourth diode 4' connected in series with one another and polled to conduct current in a direction from bus 21n to bus 21p. The second leg comprises a first diode 3, a second diode 6, a third diode 3', and a fourth diode 6' also connected in series with one another and polled to conduct current from bus 21n to bus 21p. The third leg similarly comprises a first diode 5, a second diode 2, a third diode 5', and a fourth diode 2' connected in series with one another and polled to conduct current from 21n to 2p. While each unilaterally conducting device in the three legs of the rectifying means R has been shown and described in the singular, in practice it an actually comprise a unitary assembly of multiple diodes that are interconnected in parallel (to increase the forward current rating of the rectifier leg) and/or in series (to increase the reverse voltage rating of the rectifier leg).

The first set 14 of armature windings of the alternator 12 is connected to the respective legs of the rectifying means R by means of three lines 31, 32, an 33. More specifically, the line 31 interconnects phase AS and a point between the first and second diodes 1 and 4 of the first leg, the line 32 interconnects phase b and a point between the first and second diodes 3 and 6 of the second leg, and the line 33 interconnects phase C and a point between the first and second diodes 5 and 2 of the third leg. The second set 15 of armature windings of the alternator is correspondingly connected to the respective rectifier legs by means of three lines 34, 35, and 36, with line 34 interconnecting phase A' and a point between the third and fourth diodes 1' and 4' of the first leg, line 35 interconnecting phase B' and a point between the third and fourth diodes 3' and 6' of the second leg, and line 36 interconnecting phase C' and a point between the third and fourth diodes 5' and 2' of the third leg. Thus the two sets of windings 14 and 15 are effectively connected in parallel between the d-c buses 21p and 21n. This can be illustrated by considering the currents in the respective windings of the alternator during the period of time when the potential at the terminal of the phase A (and A') winding is more positive than the potential at the terminal of the phase C (and C') winding and the potential at the terminal of the phase B (and B') winding is more negative than the potential at the terminal of the phase C (and C') winding. At this time source current flows out of the first diode 1 of the first rectifier leg to the relatively positive d-c bus 21p, and having passed through the load circuit it returns from the negative bus 21n through the fourth diode 6' of the second leg. Between diodes 1 and 6' the current splits into two parallel paths: (1) through the line 35, phases B' and A' of the second set of armature windings, the line 34, and diodes 1' and 4; (2) through diodes 3' and 6, the line 32, phases B and A of the first set of windings, and the line 31. Since each of these two paths includes the same number of diodes and since the phase A'-to-B' voltage has the same instantaneous magnitude and polarity as a phase A-to-B voltage, the parallel paths share current substantially equally. Note that each of the outboard diodes 1, 3, 5, 2', 4', and 6' now has to conduct twice as much current as each of the inboard diodes 2, 4, 6, 1', 3', and 5'. Therefore the current ratings of these devices should be based on the higher duty of the outboard diodes, or the power rectifier assembly should be physically arranged so that the outboard diodes receive preferential cooling.

With the above-described arrangement, the output current of the alternator 12 is the sum of the currents from both sets of its armature windings, while the output voltage is essentially the same as the voltage of either set alone. Preferably each of the winding sets 14 and 15 has at least as high a full-load current rating as the prior art traction alternator with only one set of 3-phase armature windings, whereas each of the sets 14 and 15 has approximately one-half the voltage rating of the prior art machine. Therefore the current and voltage allocated to each of the two paralleled motors M1 and M2 when fed from the parallel-connected sets of alternator windings have magnitudes corresponding to those that would be applied if the motors were reconnected in series with each other and supplied by the prior art alternator. As was previously explained, this low voltage, high current mode of connection is desired for low speed, relatively high tractive effort operation of the locomotive.

As shown in FIG. 1, means is provided for interconnecting the respective junctures D, E, and F of the second and third diodes in all three legs of the rectifying means R. Preferably this interconnecting means comprises first switching means C1 connected between the juncture E of the diodes 6 and 3' in the second rectifier leg and the juncture D of the diodes 4 and 1' in the first rectifier leg, and second switching means C2 connected between juncture E and the corresponding juncture F of the diodes 2 and 5' in the third leg. The switching means C1 and C2 are shown in FIG. 1 as normally open contacts of electromechanical contactors whose operating coils are in a Transition Control block 40. Pneumatically closed, spring opened contactors are well suited for this purpose. Each has an open circuit state and a closed circuit state between which it is selectively switchable in response to transition command signals supplied from a Speed Event block 41 to the transition controls 40 over a line 42. Upon switching both of the contact C1 and C2 from open to closed circuit states, these contacts are effective to short circuit the junctures D, E, and F, whereby the connection of the two sets 14 and 15 of armature windings of the alternator 12 can be transitioned from parallel to series.

With both of the switching means C1 and C2 closed, the rectifying means R is reconnected in essence as two full-wave double-way rectifier bridges whose d-c terminals are disposed in series between the power buses 21p and 21n. Now the new output voltage of the alternator is the sum of the voltages from both sets of armature windings 14 and 15, while the output current is the same as the current of either set alone. The current and voltage allocated to each of the two paralleled motors M1 and M2 when fed from the series-connected sets of alternator windings will have magnitudes corresponding to those that would be applied to the motors if supplied by the prior art alternator having only one set of 3-phase armature windings. This high voltage, low current mode of connection is desired for high speed, relatively low tractive effort operation of a locomotive. Note that each diode in the rectifier bridge R has approximately one-half the reverse voltage rating of each diode used in the rectifying means associated with the prior art alternator.

The speed event means 41, which supplies the above-mentioned transition command signals to the transition controls 40, receives a motor speed feedback signal over a line 43 from suitable means, such as a tachometer generator 44, for sensing the actual angular velocity of the rotor of one of the traction motors (or the angular velocity of the associated axle or wheel of the locomotive). In FIG. 1 the speed feedback signal is taken from motor M2, and it is in the form of a train of discrete pulses that recur at a frequency f proportional to the rotational speed of that motor. Alternatively, similar speed sensors could be associated with the other traction motor(s) and means could be provided for comparing the individual speed feedback signals so that the frequency of the signal on the line 43 is a measure of the average speed of all of the parallel motors.

The speed event means 41 is suitably constructed and arranged to initiate an "up" transition command signal indicating that the rotational speed of the motor M2 is increasing above a predetermined first threshold and to initiate a "down" transition command signal indicating that the motor speed is decreasing below a second threshold. The latter threshold is lower than the first. The transition control means 40 is operative in response to the production of the up transition command signal for causing the contacts C1 and C2 to switch from open to closed circuit states, and it is operative in response to the production of the down transition command signal for causing these contacts to switch from closed to open circuit states. The deadband or hysteresis between the first and second speed thresholds prevents control "chatter". Ideally the transition speed is selected to be that speed at which the excitation level of the alternator field for full power output with the alternator windings connected in parallel most closely approaches the excitation level for the same output with the windings connected in series. In one practical embodiment of the invention, the selected transition speed was approximately 50 km per hour. Alternatively, the transition commands could be based on the alternator output voltage and current (or voltage and current signals in the d-c motor circuits) attaining predetermined magnitudes or a critical ratio, instead of producing these commands in response to measured speed.

A preferred embodiment of the transition control means 40 is shown functionally in FIG. 2 which will now be described. The signal on the input line 42 of the transition control is either high (i.e., "1") or low (i.e., "0"), depending on the frequency f of the motor speed feedback signal that is supplied to the speed event means 41 (FIG. 1).

The input signal is low whenever f is higher than a preset amount $f_1$ that corresponds to the aforesaid first threshold of motor speed, and it is high whenever f is lower than another preset amount $f_2$ that corresponds to the aforesaid second threshold of motor speed. Starting at a frequency lower than $f_2$, as f increases from below to above $f_1$, the input signal changes from high to low, and as f subsequently decreases from above to below $f_2$, the input signal reverts to its original high state. The resulting motor speed vs. input signal relationship is tabulated in the insert that is shown in FIG. 2 under the line 42.

The input signal on the line 42 triggers an inverting and temporary seal-in circuit 45 whose purpose and operation will soon be explained. The circuit 45 includes a conventional bistable flip flop means 46 that produces on an output line 47 a digital signal which changes from low to high (0-to-1) concurrently with a 1-to-0 signal change on the input line 42 and that changes from high to low (1-to-0) concurrently with a 0-to-1 signal change on the line 42. The rising or positive edge of a high signal on the line 47 is herein referred to as the up transition command signal, and the falling or negative edge of a high signal on this line is herein referred to as the down transition command signal.

Figure 2:
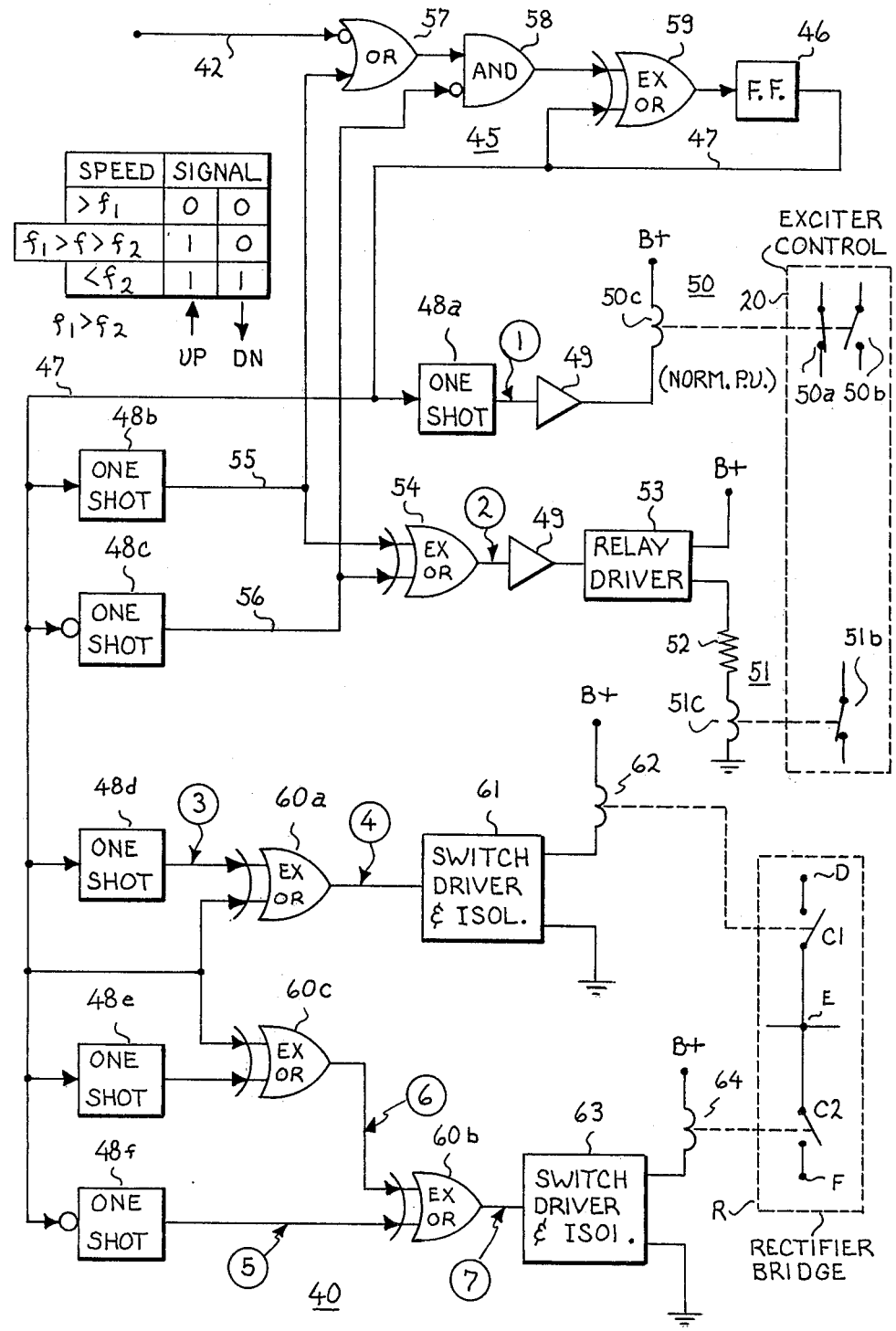
FIG. 2 is a functional block diagram of the transition control shown as a single block in FIG. 1.

The line 47 is connected to the inputs of a plurality of monostable multivibrators 48a, 48b, 48c, 48d, 48e, and 48f, each labeled "One Shot" in FIG. 2. When triggered by a rising edge of a valid high signal on the line 47 (or, in the case of the devices 48c and 48f, by a falling edge of such a signal), each of these devices produces a discrete output pulse of preselected width. The duration or width of the output pulse is determined by the parameters of an external resistor-capacitor timing circuit (not shown). Before triggering occurs, the one-shot device is in a quiescent state with its output low or "0". Hardware well suited for this purpose is known as a retrigerable monostable multivibrator and is commercially available (model MC1453B) from Motorola Semiconductor Products, Inc.

Figure 3:
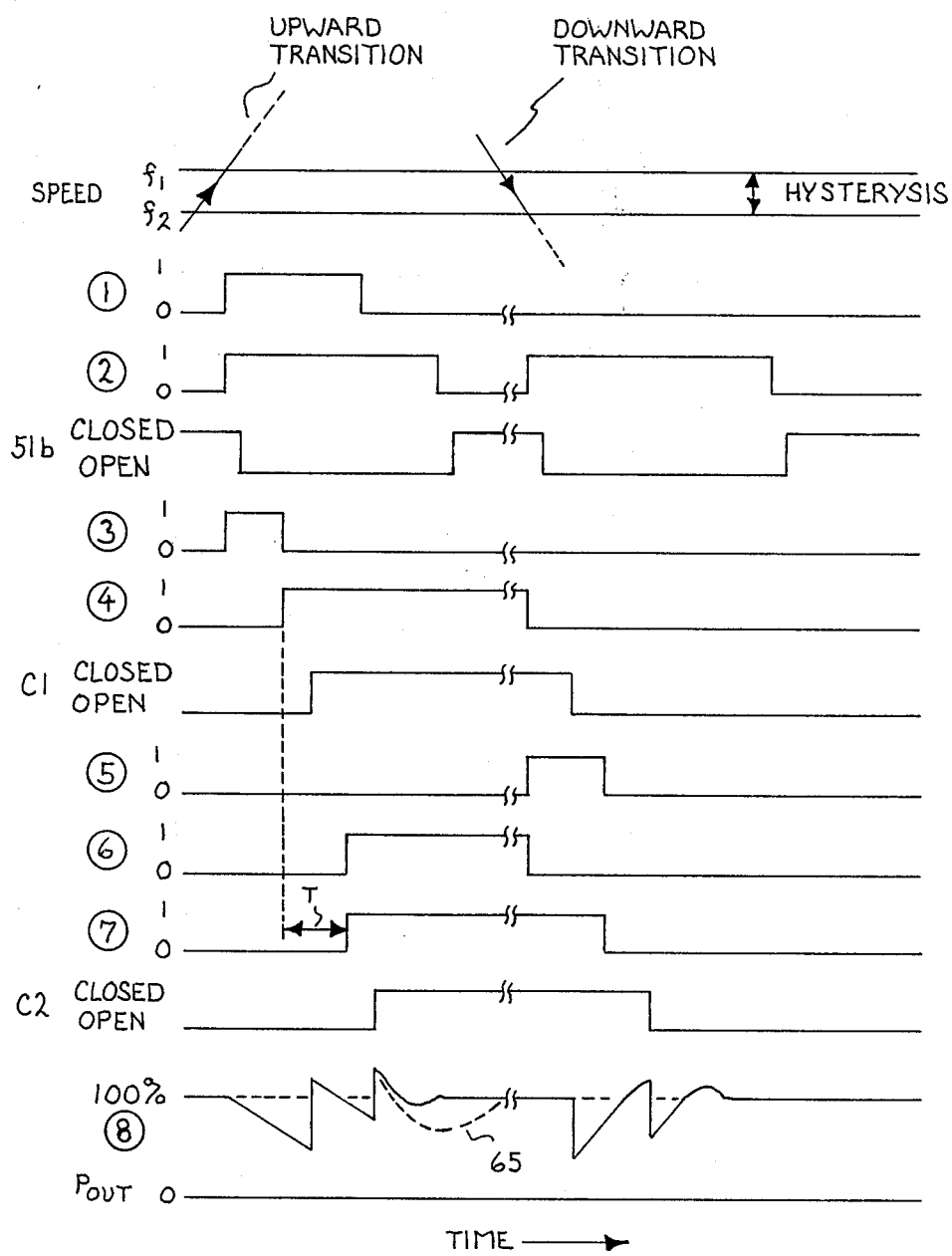
FIG. 3 is a chart showing the states of various signals identified in FIG. 2 during an upward transition interval and also during a subsequent downward transition interval.

During an upward transition (i.e., when the connection of the two sets of alternator windings is changed from parallel to series by closing the switching means C1, C2 in response to increasing motor speed), it is desirable, before initiating the closing operation of the switching means, to reduce the output power of the alternator by reducing the excitation level of its field. For this purpose means has been provided for removing the source of excitation from the exciter shunt field 19 and for boosting the excitation of the exciter series field 18 in response to a high output pulse from the device 48a. In the embodiment that is illustrated in FIG. 2, this means comprises a relay 50 having at least two contacts 50a an 50b and on operating coil 50c. The coil 50c is connected between the positive terminal B+ of a source of relatively constant control power (e.g., a 74-volt battery, not shown) and the output of a buffer amplifier 49 whose input is connected in turn to the output terminal of the first one-shot device 48a. So long as there is no output pulse from the device 48a, the coil 50c is energized an the relay 50 is maintained in its picked up state with contact 50a closed and contact 50b open. The contacts 50a and 50b are located in the exciter control block 20 where they are associated with circuits energizing the shunt field 19 and the series field 18, respectively. As is explained in more detail in the cross-referenced copending patent application Ser. No. 166,622, the alternator field is excited at a normal level while the relay 50 is picked up, but field excitation is reduced below normal when this relay is dropped out. The relay coil 50c is temporarily de-energized, whereby the excitation reducing relay 50 drops out, substantially concurrently with the output pulse from the one shot 48a. This pulse, as is depicted by the No. 1 trace in FIG. 3, is a high or "1" signal. It commences with the up transition command signal (i.e., the rising edge of a high signal on the line 47) which marks the 1-to-0 signal change on the input line 42 of the transition control means 40 due to motor speed (f) increasing above the predetermined first threshold ($f_1$), and its width or duration is preferably preselected to be of the order of 0.45 second. As will soon be apparent, approximately half of this reduced excitation time elapses before the open-to-closed state changing action of the switching means C1, C2 is initiated.

As is also more fully explained in the above-cited application Ser. No. 166,622 filed concurrently herewith, the exciter control means 20 includes normally enabled stabilizing means responsive to the rate of change of the excitation level for affecting operation of the excitation control means in a rate limiting manner, and means is provided for temporarily disabling this stabilizing means upon the production of either an up transition command signal or a down transition command signal. In the presently prefered embodiment, the disabling means comprises a relay 51 having a normally closed contact 51b in the stabilizing circuit (not shown in FIG. 2) of the exciter control and having an operating coil 51c which is connected by way of a series resistor 52 and a relay driver 53 between the control power terminal B+ and ground. The relay driver 53 responds to the output of an EXCLUSIVE OR logic circuit 54 to which it is coupled through a buffer amplifier 49. The two inputs of the EXCLUSIVE OR circuit 54 are in turn connected via lines 55 and 56 to the respective output terminals of the second and third one-shot devices 48b and 48c. Whenever there is a high output pulse from either of the devices 48b or 48c (but not both), the circuit 54 provides a high output signal that activates the relay driver 53, whereby the coil 51c is energized and the disabling relay 51 is picked up, in which state its contact 51b is held open to effect disabling of the exciter stabilizing means.

As is depicted in FIG. 3 by the trace No. 2, a high output signal from the EXCLUSIVE OR circuit 54 commences with either the up transition command signal which triggers the one-shot device 48b or the down transition signal which triggers the one-shot device 48c. The latter signal, as was previously explained, is the falling edge of a high signal on line 47, and it marks the 0-to-1 signal change on the input line 42 of the transition control means 40 due to motor speed (f) decreasing below the predetermined second threshold ($f_2$). (By connecting the line 47 to the negative-edge triggering input of the device 48c as indicated symbolically in FIG. 2, this device is made responsive to the down transition command signal.) By appropriately preselecting the timing components associated with the one shots 48b and 48c, respectively, the signal No. 2 will continue in its high state for an interval of approximately 0.8 second following an up command signal, whereas it will continue in its high state for an interval of approximately 0.7 second following a down command signal. In either case, the intervals are appreciably longer than the time that elapses from the production of the transition command signal to the conclusion of the resulting state changing action of the switching means C1, C2. As is indicated in FIG. 3, the relay contact 51b opens in slightly delayed response to the 0-to-1 changes of the signal No. 2, and it recloses in slightly delayed response to the subsequent 1-to-0 changes of this signal.

As it is shown in FIG. 2, the inverting and temporary seal in means 45 of the transition control block 40 comprises an OR logic circuit 57, an AND logic circuit 58, and an EXCLUSIVE OR logic circuit 59, in addition to the flip-flop means 46. The input line 42 of the transition control block is connected to an inverting input of the OR circuit 57, and the output line 55 of the second one-shot device 48b is connected to the other input of this circuit. Consequently, the output signal of the OR circuit 57 is in a high state whenever either the input signal on the line 42 is low ("0") or there is a high ("1") pulse on the line 55. One of the two inputs of the AND circuit 58 is connected to the output of the OR circuit 57. The other input of the circuit 58, an inverting input, is connected to the output line 56 of the third one-shot device 48c, and thus the output of the AND circuit 58 is in a high state only when there is a high signal out of the OR circuit 57 and no high pulse on the line 56. The output of the AND circuit 58 is connected to a first input of the EXCLUSIVE OR circuit 59, and the line 47 is connected to the second input of the latter circuit. The output of the circuit 59 is in turn connected to the input of the flip-flop means 46.

Assuming that initially the flip flop 46 is in a reset state (i.e., the signal on its output line 47 is low) and both of the one-shot devices 48b and 48c are in quiescent states (i.e., the signals on both of the lines 55 and 56 are low), the first 1-to-0 signal change on the input line 42 is immediately reflected by a 0-to-1 signal transition at both the first input and the output of the EXCLUSIVE OR circuit 59. This causes the flip flop 46 to change states and thereby raise the level of the signal on line 47 from low to high. At the same time, the one shot 48b is triggered so that the signal on line 55 correspondingly changes to a high state, while the input signal to the flip flop 46 reverts to a low state (because both inputs to the EXCLUSIVE OR circuit 59 are now high). During the preset timing interval of the one shot 48b, the OR circuit 57 ensures that the first input to the EXCLUSIVE OR circuit 59 remains high, thereby temporarily preventing any further state change by the flip flop 46. Subsequently, once the high pulse on line 55 terminates, any 0-to-1 signal change on the input line 42 of the transition control means results in a 1-to-0 signal transition at the first input of the EXCLUSIVE OR circuit 59, and the latter circuit now supplies a high signal to the input of the flip flop 46 which causes this device to change states again and thereby lower the level of the signal on line 47. At this time the one-shot device 48c is triggered so that the signal on line 56 changes to a high state, while the input signal to the flip flop 46 will revert to a low state (because both inputs to the EXCLUSIVE OR circuit 59 are now low). During the preset timing interval of the one shot 48c, the AND circuit 58 ensures that the first input of the circuit 59 remains low, thereby temporarily preventing any further state change by the flip flop 46.

The purpose of the temporary seal-in circuit 45 just described is to ensure that the signal on the line 47 is sustained in its high (or low) state without interruption for at least a predetermined minimum period of time following each state change of the flip-flop device 46, thereby allowing time for the up (or down) transition to be completed, once initiated, even if the signal on the input line 42 were prematurely to revert to its prior state. When the output pulse from the one-shot device 48b (or 49c) terminates after an up (or down) transition has been completed, the temporary seal-in effect is negated and the flip flop 46 is again free to produce a state change of the signal on its output line 47 in response to any intervening or subsequent state change of the input signal supplied to the transition control means 40.

As was previously mentioned, actuation of the switching means C1, C2 from open to closed circuit states is delayed, after the production of an up transition command signal, in order to allow time for the alternator field excitation to decrease below normal (as a result of the excitation reducing relay 50 dropping out) before the switching operation is initiated. In FIG. 2 this delay is introduced by the fourth one-shot device 48d whose output is connected to a first input of an EXCLUSIVE OR logic circuit 60a. The line 47 is connected to the second input of the circuit 60a, and the output signal of this circuit provides an input to a switch driver and isolating block 61 that is part of the actuating means for the contact C1. The switch driver 61 connects the operating coil 62 of the contact C1 between B+ and ground. So long as the input signal to the switch driver 61 is not high, the coil 62 is de-energized and the contact C1 is open, but a high input signal will activate the switch driver, whereby the coil 62 is energized and the contact C1 is closed. In FIG. 3 the high and low states of the output pulse from the one shot 48d and the input signal to the switch driver 61 are depicted by traces Nos. 3 and 4, respectively.

The timing components of the one shot 48d are preselected so that once triggered by an up transition command signal on the line 47 this device produces an output pulse (trace No. 3) having a duration of approximately 0.2 second, during which time the input signal (trace No. 4) to the switch driver 61 continues to be low ("0") because both inputs of the EXCLUSIVE OR circuit 60a are then high. The signal No. 4 rises to a high level upon termination of a high pulse from the device 48d, and it remains high ("1") until the next down transition command signal (i.e., a 1-to-0 signal change) on the line 47. The 0-to-1 change of the signal No. 4 initiates the contact closing operation of the switch driver 61, and a short time thereafter (due to electrical and mechanical inertia) the contract C1 is actually moved from its open circuit position to its closed circuit position. A subsequent 1-to-0 change of the signal No. 4 initiates the contact opening operation of the switch driver 61, and a short time thereafter (again due to electrical and mechanical inertia) the contact C1 is actually moved from its closed circuit position to its open circuit position.

Preferably the second contact C2 of the switching means is closed (or opened) in sequence rather than simultaneously with the companion contact C1. Staggering the operations of these two contacts will desirably reduce the size of the increment (or decrement) in alternator output power that accompanies an upward (or downward) transition. If both contacts closed simultaneously to change the connection of the two sets of alternator armature windings from parallel to series in one step, the rectified output voltage of the alternator would tend abruptly to double, and consequently the output power (proportional to the voltage squared) would tend to quadruple. This could result in bogging of the engine 11 and smoke in the engine exhaust stack, and it could cause fast acceleration and potential overspeed of the turbocharger. These factors plus the resulting jerky acceleration of the locomotive would adversely stress the couplers that mechanically join the locomotive to the adjacent car of the train of rail cars being propelled by the locomotive and that join the respective cars to one another. Related problems would be observed during a downward transition if the contacts C1 and C2 were opened simultaneously to change the alternator winding connection from series to parallel in one step, in which case the sudden loss of alternator output power would result in an appreciable decrease in the turbocharger speed which in turn would impede the full-load restoring response of the excitation system. It has been found that in either case the transition is significantly smoother and faster and the train handling is noticeably better when the first and second switching means C1 and C2 are operated in sequence and, as previously described, the excitation stabilizing means is disabled during the transition process.

In order to cause the second contact C2 to close after the first contact C1 has been closed in response to an up transition command signal, the means illustrated in FIG. 2 for actuating the contact C2 includes the fifth one-shot device 48e, and the duration of the output pulse of this device is preselected to be approximately 0.4 second which is appreciably longer than the duration of the output pulse from the above-described one shot 48d. The output of the device 48e is connected to a first input of an EXCLUSIVE OR logic circuit 60c, whereas the line 47 is connected to the second input of this circuit. The output of the circuit 60c is in turn connected to a first input of another EXCLUSIVE OR logic circuit 60b whose second input is connected via the sixth one-shot device 48f to the line 47. The line 47 is actually connected to the negative-edge triggering input of the one-shot device 48f, as is indicated symbolically in FIG. 2, whereby this device responds to the down transition command by producing a high output pulse (trace No. 5 in FIG. 3) having a preselected fixed duration (e.g., 0.25 second). Thus during the upward transition the signal (No. 5) supplied to the second input of the circuit 60b is always low, whereas the signal supplied to the first input of this circuit will, as indicated by trace No. 6 in FIG. 3, rise to a high level upon termination of a high pulse from the one-shot device 48e which occurs in delayed response to the up transition command signal. The resulting output signal of the circuit 60b is depicted by trace No. 7 in FIG. 3.

The output signal of the EXCLUSIVE OR circuit 60b provides an input to a switch driver and isolating block 63 that is part of the actuating means for the contact C2. The switch driver 63 connects the operating coil 64 of the contact C2 between B+ and ground. So long as the input signal (No. 7) to the switch driver 63 is not high, the coil 64 is deenergized and the contact C2 is open, but a high input signal will activate the switch driver, whereby the coil 64 is energized and the contact C2 is closed. The 0-to-1 change of the signal No. 7 that initiates the open-to-closed state changing action of C2 occurs a predetermined interval of time after the corresponding action of the contact C1 has been initiated by signal No. 4 in delayed response to an up transition command. This time interval, which in the FIG. 2 embodiment is determined by the difference (e.g., 0.2 second) between the fixed time delays respectively introduced by the devices 48d and 48e, is indicated by the reference letter T in FIG. 3. A short time after signal No. 7 rises to a high level, the contact C2 is actually moved from its open circuit position to its closed circuit position.

Once the contact C2 is closed, the one-shot device 48f delays subsequent initiation of a closed-to-open state changing action of C2 until a predetermined interval of time after the corresponding action of the contact C1 has been initiated by the 1-to-0 change of the signal No. 4 in response to a down transition command. The output signal (No. 7) of the circuit 60b will remain high until both of the input signals (Nos. 5 and 6) to this circuit fall to their low states in delayed response to the down command signal, whereupon the signal No. 7 changes to a low state and, after further delay due to electrical and mechanical inertia, the contact C2 is moved from its closed circuit position to its open circuit position. In the FIG. 2 embodiment the time interval between the 1-to-0 changes of the two signals 4 and 7 is equal to the fixed duration (e.g., 0.25 second) of the high output pulse from the one shot 48f.

The operation of the above-described transition control means 40 to cause an upward (or downward) transition of the switching means C1, C2 will now be reviewed with the aid of FIG. 3 in which the trace No. 8 represents the per unit magnitude of the electrical power output of the alternator 12 as a function of time. The upward transition commences with the production of an up command signal in response to the frequency of an increasing speed feedback signal intersecting the predetermined level $f_1$ which corresponds to the first threshold of the traction motor speed, and at this time the signals 1, 2, and 3 immediately rise to high states in which they will temporarily remain. A high No. 1 signal causes relay 50 to drop out, thereby reducing the alternator field excitation, and a high No. 2 signal causes the relay 51 to pick up, thereby disabling the stabilizing circuit in the excitation control means 20. Consequently the field excitation begins to decrease below it normal level at a fast rate, the amplitude of the voltages generated in the individual alternator windings correspondingly decreases, and the alternator power (trace No. 8 in FIG. 3) ramps downward from 100 percent of the limit being called for by a power reference circuit in the excitation control means 20. After a delay corresponding to the period of time that the signal No. 3 is high, signal 4 rises to a high state which initiates closure of the first contact C1 of the switching means. When C1 is closed it provides a conducting path of negligible resistance between the junctures D and E of the power rectifier bridge R (FIG. 1), whereby the phase A-to-B output of the first set 14 of alternator windings is connected in series with the phase A'-to-B' output of the other set 15. With C1 closed and C2 open, an unbalanced condition exists. In this unbalanced or hybrid condition, the connection of the two sets of alternator windings is partly parallel and partly series, and the voltage (and current) waveforms of the individual windings are highly distorted compared to pure sinewaves of equal amplitudes.

At the same time that the first switching means actually closes its contact C1 there is a step increase in the output power of the alternator due to the summing of the phase-to-phase voltages generated in the two phases of the respective sets of alternator windings that are now serially interconnected. (This increment would have been larger if C2 were closed simultaneously with C1.) After C1 closes the field excitation continues to decrease at a fast rate, and the alternator power (trace No. 8) again ramps downward as shown in FIG. 3 until the second contact C2 of the switching means is closed in response to signal No. 7 changing from low to high states. This state changing event of the signal 7, which occurs when signal 6 rises to a high state in delayed response to the production of the up transition command signal, is delayed a sufficiently long time to ensure that C2 closes after C1. Shortly after signal No. 6 goes high, the signal No. 1 will fall to its low state, whereupon the excitation reducing relay 50 picks up to terminate its period of reduced excitation.

When the contact C2 of the second switching means is actually moved to its closed position, it provides a conducting path of negligible resistance between the junctures E and F of the power rectifier bridge R, thereby completing the series connection of the two alternator winding sets 14 and 15. At the same time there is another step increase in the output power of the alternator due to the summing of the phase-to-phase voltages generated in all three phases of the respective sets of alternator windings. The excitation control means 20 is now effective to vary the normal level of alternator field excitation at a fast rate, unlimited by the excitation stabilizing means which is still temporarily disabled, and the difference between actual and reference values of the alternator output power is rapidly reduced. This regulating action quickly restores the output power to 100 percent of its desired value, and acceleration of the locomotive can continue without noticeable surge of power or speed. Some time after completion of the open-to-closed switching operation of the second contact C2, the signal No. 2 will fall to its low state and the relay 51 will consequently drop out to terminate the disabled period of the excitation stabilizing means.

In summary, the upward transition is carried out relatively smoothly and quickly, with good train handling characteristics, by first temporarily reducing alternator field excitation below normal and disabling the normally enabled excitation stabilizing means, and by then closing the two contacts of the switching means C1, C2 in sequence. If the stabilizing means in the excitation control means 20 were not disabled throughout this transition, it would impede and prolong restoration of the desired output power after the period of reduced excitation terminates, as is indicated by way of example by the broken line 65 in FIG. 3.

A subsequent downward transition commences with the production of a down command signal in response to the frequency of a decreasing speed feedback signal intersecting the predetermined level $f_2$ which corresponds to the second threshold of traction motor speed, and at this time the signals 2 and 6 immediately rise to high states in which they will temporarily remain. A high No. 2 signal causes the relay 51 to pick up, thereby disabling the excitation stabilizing circuit in the excitation control means 20. The down command also causes signal 4 to fall to a low state which initiates opening of the first contact C1 of the switching means. With C1 open and C2 closed, the unbalanced, hybrid condition again exists, and the connection of the two alternator winding sets 14 and 15 is partly parallel and partly series.

At the same time that the first switching means actually opens its contact C1 there is a step decrease in the output power of the alternator. (This decrement would have been larger if C2 were opened simultaneously with C1.) After C1 opens, the excitation control means 20 increases the normal level of alternator field excitation at a fast rate, the fundamental amplitudes of the voltages generated in the individual alternator windings correspondingly increase, and consequently the alternator power (trace No. 8 in FIG. 3) ramps upward until the second contact C2 of the switching means is opened in response to signal No. 7 changing from high to low states. The latter state changing event of the signal 7 occurs when signal 5 falls to a low state in delayed response to the production of the down transition command signal.

With both contacts of the switching means C1, C2 open, the two alternator winding sets 14 and 15 are effectively connected in parallel with one another. At the same time that C2 moves to its open circuit position, there is another step decrease in the output power of the alternator due to the paralleling of the phase-to-phase voltages generated in all three phases of the respective sets of alternator windings. The excitation control means continues to vary the normal level of alternator field excitation at a fast rate, unlimited by the excitation stabilizing means which is still temporarily disabled, and the difference between actual and reference values of the alternator is rapidly reduced. This regulating action quickly restores the output power to 100 percent of its desired value, and deceleration of the locomotive can continue without precipitous loss of power or speed. Sometime after completion of the closed-to-open switching operation of the second contact C2, the signal No. 2 will fall to its low state and the relay 51 will consequently drop out to terminate the disabled period of the excitation stabilizing means. In summary, the downward transition is carried out relatively smoothly and quickly, with good train handling characteristics, by temporarily disabling the normally enabled excitation stabilizing means and by opening the two contacts of the switching means C1, C2 in sequence.

Figure 4:
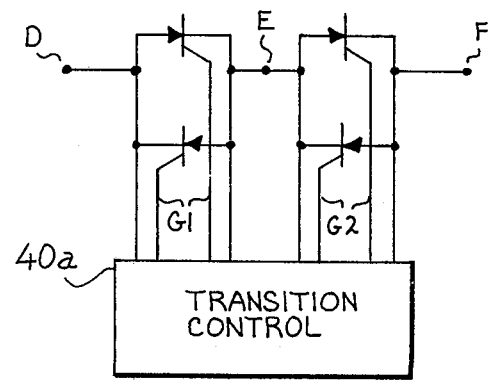
FIG. 4 is a schematic diagram of an alternative form of the switching means shown in FIG. 1.

While the first and second switching means C1 and C2 are preferably conventional electromechanical contactors, each of these contacts could, if desired, be replaced by a solid state equivalent comprising inverse-parallel connected controlled rectifiers. Such an alternative is illustrated in FIG. 4 where a first pair of inverse parallel controlled rectifiers (depicted symbolically as simple thyristors) is shown connected between the junctures D and E and a second pair of such rectifiers is shown connected between the junctures E and F. For actuating these devices the control electrodes or gates G1 of the first pair of thyristors and the control electrodes or gates G2 of the second pair of thyristors are connected to an associated transition control block 40a. This block is operative in delayed response to the production of an up transition command signal to initiate open-to-closed state changes of the respective thyristor pairs, and it is also operative in response to the production of a down transition command signal to initiate closed-to-open state changes of the respective thyristor pairs. In order to initiate open-to-closed state changing action of the first pair of thyristors, the block 40a supplies firing signals to the respective gates G1, thereby enabling each of these thyristors in turn to switch to its low resistance, forward conducting (i.e., closed circuit) state when its main electrodes are forward biased by a small potential difference between junctures D and E. To initiate the closed-to-open state changing action of the first pair of thyristors, the aforesaid firing signals are inhibited or suppressed, whereupon each thyristor in turn reverts to its high resistance, non-conductive (i.e., open circuit) state when its main electrodes are next reversed biased by the voltage between D and E. The second pair of thyristors is similarly actuated between open and closed circuit states by firing signals supplied to their respective gates G2. Preferably, for reasons heretofore explained in connection with the description of FIGS. 2 and 3, the transition control block 40a includes suitable means for delaying the initial production and the later suppression of firing signals that are supplied to the gates G2 of the second pair of thyristors with respect of the firing signals that are supplied to the gates G1 of the first pair of thyristors, whereby the two pairs of thyristors are respectively turned on in sequence in response to an up transition command signal and are respectively turned off in sequence in response to a down transition command signal.

Figure 5:
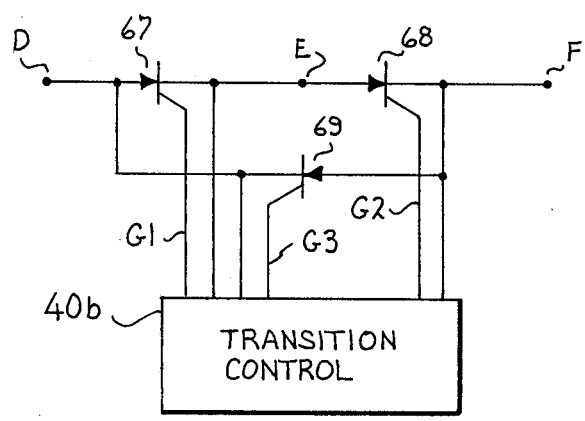
FIG. 5 is a schematic diagram of another alternative form of the switching means.

The switching means C1, C2 could alternatively comprise three thyristors 67, 68, and 69 arranged in a "delta" configuration for interconnecting the respective junctures D, E, and F, as is shown in FIG. 5. The anode of the thyristor 67 and the cathode of thyristor 69 are both connected to the juncture D, the anode of the thyristor 68 and the cathode of thyristor 67 are both connected to the juncture E, and the anode of thyristor 69 and the cathode of thyristor 68 are both connected to the juncture F. The control electrodes or gates G1, G2, and G3 of the respective thyristors 67, 68, and 69 are connected to an associated transition control block 40b which is operative to supply firing signals to these gates and to inhibit or suppress the firing signals in response to a down transition command signal. With firing signals applied to their gates, the three thyristors in turn are able to conduct current when forward biased (i.e., when anode potential is positive with respect to cathode), and in this closed circuit state they effectively short circuit junctures D, E, and F.

DESCRIPTION OF AN ALTERNATIVE EMBODIMENT

Figure 6:
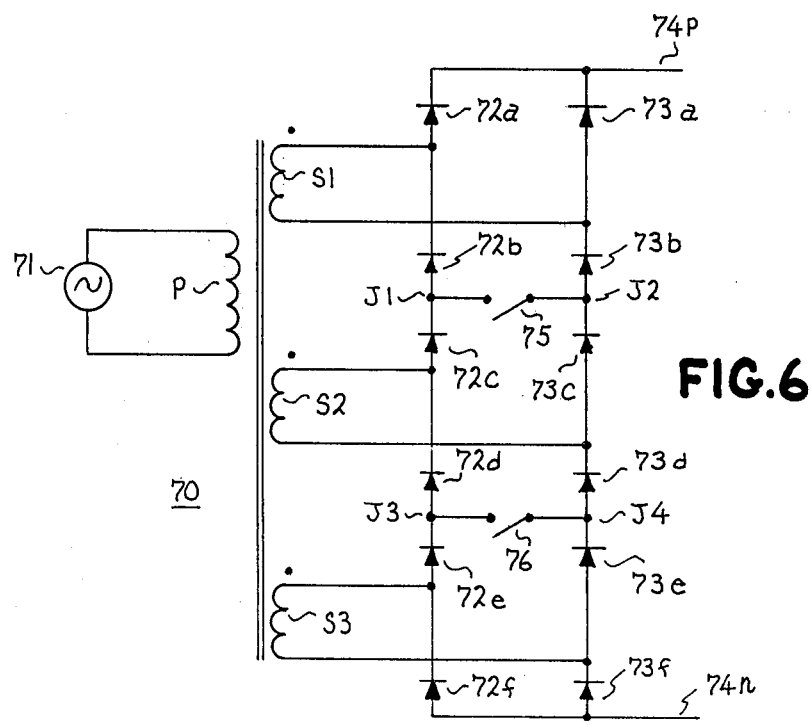
FIG. 6 is a schematic diagram of an alternative embodiment of the invention.

While the invention has been shown and described above in the context of a multi-winding 3-phase power supply, it is also useful with multi-winding single-phase power supplies such as the one illustrated in FIG. 6. In FIG. 6 a power transformer 70 is provided with three duplicate secondary windings S1, S2, and S3 and a single high-voltage primary winding P to which a suitable source 71 of a-c electric power is connected. The low voltage secondary windings S1, S2, and S3 are connected to a pair of relatively positive and negative d-c load buses 74p and 74n by way of a power rectifier assembly comprising first and second legs interconnected in parallel circuit relationship between these buses. The first rectifier leg comprises six serially interconnected unilaterally conducting devices 72a through 72f, and the second rectifier leg comprises six more serially interconnected unilaterally conducting devices 73a through 73f. All of the unilaterally conducting devices are polled to conduct current in a direction from bus 74n to 74p. While these devices are shown and referred to as simple diodes, persons skilled in the art will understand that in practice some or all of the unilaterally conducting devices in one or both legs can actually be controlled electric valves such as phase controlled thyristors or SCRs.

As can be seen in FIG. 6, the dot end of the secondary winding S1 of the transformer 70 is connected to a point between the first diode 72a and the second diode 72b of the first rectifier leg, and the other end of S1 is connected to a point between the first and second diodes 73a and 73b of the second rectifier leg. The dot end of the secondary winding S2 is connected to a point between the third and fourth diodes 72c and 72d of the first rectifier leg, and the other end of S2 is connected to a point between the corresponding diodes 73c and 73d of the second leg. The dot end of the third winding S3 is connected to a point between the fifth and sixth diodes 72e and 72f of the first rectifier leg, and the other end of S3 is connected to a point between the fifth and sixth diodes 73e an 73f of the second leg. The juncture J1 of the second and third diodes 72b and 72c in the first rectifier leg and the juncture J2 of the corresponding diodes in the second rectifier leg are interconnected by switching means 75 shown as a contact having open and closed circuit states. The juncture J3 of the fourth and fifth diodes 72d and 72e in the first rectifier leg and the corresponding juncture J4 in the second rectifier leg are similarly interconnected by switching means 76 also shown as a contact having open and closed circuit states.

Each of the contacts 75 and 76 is selectively switchable between its respective states in response to transition command signals. Whenever both 75 and 76 are open, all three secondary windings of the transformer 70 are effectively connected in parallel between the d-c load buses, whereby the output voltage of the transformer is essentially the same as the voltage generated in any one of its secondary windings but the output current is the sum of the currents from all three secondaries. By closing the contact 75 to short circuit the junctures J1 and J2 while the contact 76 remains open, the secondary winding S1 is reconnected in series with the parallel combination of windings S2 and S3. When both contacts are closed, the three secondary windings are effectively connected in series with one another between the bus 74p and 74n, whereby the output current of the transformer is the same as the current contributed by any one secondary alone but the net output voltage is the sum of the voltages from all three secondary windings.

While alternative forms of the invention have been herein shown and described by way of illustration, other modifications and variations therein will probably occur to persons skilled in the art. It is therefore intended by the concluding claims to cover all such changes and modifications as fall within the true spirit and scope of this invention.

We claim:

1. In combination:
   (a) a pair of d-c load buses;
   (b) rectifying means having at least first and second legs interconnected in parallel circuit relationship between said buses, each of said legs comprising first, second, third, and fourth unilaterally conducting devices connected in series with one another and polled to conduct current in a direction from one of said buses to the other;
   (c) an a-c power supply comprising at least first and second separate windings so arranged that in-phase alternating voltages of equal amplitudes are respectively generated therein;
   (d) means for connecting said first winding between a point between the first and second devices of said first rectifier leg and a point between the corresponding devices of said second rectifier leg and for connecting said second winding between a point between the third and fourth devices of said first rectifier leg and a point between the corresponding devices of said second leg, whereby said windings are effectively connected in parallel between said buses; and
   (e) means for interconnecting the respective junctures of the second and third devices in all of the legs of said rectifying means, said interconnecting means having open circuit and closed circuit states between which it is selectively switchable in response to transition command signals and being effective upon switching from open to closed circuit states to short circuit said junctures, whereby the connection of said first and second windings can be changed from parallel to series.

2. The combination as set forth in claim 1 wherein said power supply is a transformer having a singlephase primary winding and at least first and second separate secondary windings.

3. The combination as set forth in claim 2 wherein each leg of said rectifying means includes fifth and sixth unilaterally conducting devices connected in series with the other devices of that leg, wherein said transformer has an additional secondary winding that is a duplicate of said first and second windings, said additional winding being connected between a point between the fifth and sixth devices of said first rectifier leg and a point between the corresponding devices of said second rectifier leg, and wherein means is provided for interconnecting the respective junctures of the fourth and fifth devices in all of the legs of said rectifying means, said last-mentioned interconnecting means having an open circuit state and a closed circuit state between which it is selectively switchable in response to transition command signals and being effective upon switching from open to closed circuit states to short circuit said last-mentioned junctures.

4. The combination as set forth in claim 1 wherein said rectifying means includes a third leg interconnected in parallel circuit relationship with said first and second legs and wherein said power supply comprises first and second separate sets of 3-phase windings so arranged that the alternating voltages generated in the respective windings of said first set will be substantially in phase with the alternating voltages generated in the corresponding windings of said second set, the windings of said first set being connected to the respective legs of said rectifying means at points between the first and second devices thereof and the windings of said second set being connected to the respective legs of said rectifying means at points between the third and fourth devices thereof.

5. The combination as set forth in claim 4 wherein said interconnecting means comprises first and second switching means respectively connected between the juncture of the second and third devices in one of said rectifier legs and the corresponding junctures of the second and third devices in the other two legs of said rectifying means, each of said switching means having open circuit and closed circuit states, said first and second sets of windings being effectively connected in series between said buses when both of said switching means are in their closed circuit states.

6. The combination as set forth in claim 4 wherein said power supply comprises a dual winding traction alternator and wherein said d-c buses are adapted to be connected to a plurality of parallel d-c traction motors.

* * * * *